US010139219B2

(12) United States Patent
Takesue et al.

(10) Patent No.: US 10,139,219 B2
(45) Date of Patent: Nov. 27, 2018

(54) OPTICAL DISTANCE MEASURING APPARATUS

(71) Applicant: ASTRODESIGN, Inc., Tokyo (JP)

(72) Inventors: Toshiharu Takesue, Tokyo (JP); Shigeto Takeda, Tokyo (JP); Nobuyuki Nishizawa, Tokyo (JP); Tatsuho Arima, Tokyo (JP); Shigeaki Suzuki, Tokyo (JP)

(73) Assignee: ASTRODESIGN, INC., Tokyo (JP)

( * ) Notice: Subject to any disclaimer, the term of this patent is extended or adjusted under 35 U.S.C. 154(b) by 0 days.

(21) Appl. No.: 15/373,893

(22) Filed: Dec. 9, 2016

(65) Prior Publication Data

US 2017/0176177 A1 Jun. 22, 2017

(30) Foreign Application Priority Data

Dec. 17, 2015 (JP) .................................. 2015-245809
Nov. 29, 2016 (JP) .................................. 2016-230776

(51) Int. Cl.
*G01B 11/30* (2006.01)
*G01B 11/24* (2006.01)
(Continued)

(52) U.S. Cl.
CPC ............ *G01B 11/24* (2013.01); *G01B 11/245* (2013.01); *G02B 21/0096* (2013.01)

(58) Field of Classification Search
CPC ........ G01J 1/4257; G01J 9/00; G01M 11/061; G01M 11/064; G01M 11/06
(Continued)

(56) References Cited

U.S. PATENT DOCUMENTS 9,194,818 B2  11/2015  Takesue
9,316,536 B2   4/2016  Takesue
(Continued)

FOREIGN PATENT DOCUMENTS

EP  2653830 A2  10/2013
EP  2818905 A2  12/2014
(Continued)

OTHER PUBLICATIONS

European Patent Application No. 16002689.4: Extended European Search Report (EESR) and Opinion under Rule 62(1) EPC dated May 29, 2017.
(Continued)

*Primary Examiner* — Md M Rahman
(74) *Attorney, Agent, or Firm* — Kratz, Quintos & Hanson, LLP

(57) ABSTRACT

An optical distance measuring apparatus includes: a scanning element scanning a coherent irradiation light from a light source and sending it to an object under measurement; a photo detector receiving the irradiation light modulated by being passed through the object under measurement in accordance with the scanning, and performing photoelectric conversion on the irradiation light; and a measuring unit obtaining phase information of the object under measurement based on a signal photoelectrically converted by the photo detector and a signal to be a reference for the scanning by the scanning element, and obtaining a measurement value regarding the object under measurement based on the phase information.

5 Claims, 8 Drawing Sheets

(51) Int. Cl.
*G01B 11/245* (2006.01)
*G02B 21/00* (2006.01)

(58) Field of Classification Search
USPC .......................................................... 356/601
See application file for complete search history.

(56) References Cited

U.S. PATENT DOCUMENTS

| | | | |
|---|---|---|---|
| 2013/0280798 A1* | 10/2013 | Takesue | G01N 22/00 435/288.7 |
| 2014/0374575 A1* | 12/2014 | Takesue | G01J 1/44 250/208.5 |

FOREIGN PATENT DOCUMENTS

| | | |
|---|---|---|
| JP | S59-214706 | 12/1984 |
| JP | 2000-185577 A | 7/2000 |
| JP | 2015-004643 A1 | 1/2015 |

OTHER PUBLICATIONS

Japanese Patent Application No. 2016-230776: Notification of Reasons for Refusal dated Apr. 4, 2017.

Kuang et al., Digital micromirror device-based laser-illumination Fourier ptychographic microscopy, Optics Express, vol. 23, No. 21, Oct. 5, 2015, p. 26999.

D.K. Hamilton, et al.; "Differential phase contrast in scanning optical microscopy;" Journal of Microscopy; vol. 133; Pt. 1; Jan. 1984; pp. 27-39 (13 Sheets).

G. Popescu, et al.; "Fourier phase microscopy for investigation of biological structures and dynamics;" Optics Letters; vol. 29; No. 21; Nov. 1, 2004; pp. 2503-2505 (3 Sheets).

Z. Wang, et al.; "Spatial light interference microscopy (SLIM);" Optics Express; vol. 19; No. 2; Jan. 17, 2011; pp. 1016-1026 (11 Sheets).

\* cited by examiner

OPTICAL DISTANCE MEASURING APPARATUS

BACKGROUND OF THE INVENTION

1. Field of the Invention

The present invention relates to an optical distance measuring apparatus realizing, with a quite high resolution, measurement of a profile of a surface state of an object under measurement, measurement or observation of a surface state and an internal state of a cell or the like by irradiation of laser lights, and is preferable for an apparatus improving a resolution of an optical apparatus such as a microscope.

2. Description of the Related Art

With a conventional optical microscope, it has been difficult to perform three-dimensional measurement, and besides, it has not been possible to observe or measure an object under measurement at or below a diffraction limit. As a substitute for this, apparatuses such as a scanning electron microscope, a probe microscope (STM, AFM, NFOS, or the like), and a confocal microscope have been developed and used in many fields.

The scanning electron microscope uses a very narrow beam as a scanning electron probe, and thus has a high resolution and a significantly large focal depth as compared to the optical microscope. However, for observing an object under measurement with low electric conductivity such as a cell, it is necessary to coat platinum palladium or gold with good electric conductivity on a sample as the object under measurement. Accordingly, this often accompanies damage to a cell itself, and of course it has not been possible to observe or measure a live cell.

Further, the probe microscope is to measure a distance to an object under measurement by making a probe, which is disposed close to the object under measurement, further close to the object under measurement, and utilizing atomic force, tunnel current, light near field or the like. However, it is difficult to move the probe at high speed, handling is difficult because the distance to the object under measurement is quite close, and moreover a long time is needed for obtaining two-dimensional information.

On the other hand, the confocal microscope irradiates a spot light to an object under measurement, and moves an objective lens or the object under measurement so that an amount of light received by a photo detector disposed at a confocal position becomes maximum for this spot light via a pin hole, to thereby obtain height information or path difference information of the object under measurement. However, in the confocal microscope, basically, when there is a phase distribution within a spot, the beam is deformed, which results in erroneous information. In particular, for an object under measurement on which a wavefront changes in phase, like a refractive index change in a cell or the like, it must be said that reliability of the value thereof is poor. Further, it is necessary to move the objective lens or the object under measurement so that the received amount of light becomes maximum, and thus the measurement cannot be performed in real time.

Under such circumstances, in accordance with development of micronanotechnology field in recent years, a technique of measuring, at high speed, three-dimensional information of a minute industrial product or precision component, is drawing attention. In addition to this, there is increasing a demand such that, in biology, medical science, and agricultural science, three-dimensional profile information regarding a biological sample having a thickness such a cell, in a living state, is wanted to be obtained in real time.

On the other hand, as one of methods for measuring a distance and a thickness with high accuracy or for measuring or observing a minute object with high accuracy by using a microscope, a heterodyne interference method is well known. Here, an optical heterodyne method using lights will be described, but, a heterodyne method is also performed with the similar idea for other electromagnetic waves. This optical heterodyne method makes two laser lights with different frequencies interfere with each other to create a beat signal of the frequency difference, and detects a phase change of this beat signal with a resolution of about $1/500$ of a wavelength. That is, with this optical heterodyne method, it is possible to measure a distance to an object under measurement while measuring a change in a height direction of a surface being three-dimensional information, or to measure or observe a thickness and the like of an object under measurement itself.

Patent Document 1: Japanese Patent Application Laid-open No. S59-214706

The aforementioned Japanese Patent Application Laid-open No. S59-214706 of Patent Document 1 discloses a method to adjacently generate two beams composed of different wavelengths by using an acoustic optical device, detect a phase change between these two beams, and obtain a surface profile by increasing the phase change cumulatively. However, this Patent Document 1 is to make two beams be close and slightly larger than a beam profile, detect an average phase difference in two beam profiles by heterodyne wave detection, and sequentially integrate the phase difference, so as to obtain concave and convex information.

Therefore, according to this Patent Document 1, it is possible to measure concave and convex information of an object under measurement which is assumed to be flat such as a semiconductor wafer, but it is not possible to extract information inside the beam profile. Accordingly, it is not possible to increase the resolution inside the beam profile, which is in a plane.

From the foregoing, with the conventional technique of the microscope and the like, it has not been possible not only to increase the resolution inside the beam profile, which is in a plane, but also to observe or measure, in real time, three-dimensional information regarding a biological sample having a thickness such as a cell, in a living state, without damaging the sample.

The present invention is made in view of the above-described background, and an object thereof is to provide an optical distance measuring apparatus having a high resolution in a plane as well as a high resolution with respect to a height or a refractive index distribution outside the plane, and having an effectively high resolution and causing no loss of spatial frequency by accurately reproducing spatial frequency information which an object under measurement has by obtaining a spatial frequency which cannot be obtained with an ordinary imaging optical system.

A first invention of an optical distance measuring apparatus includes:

a light source irradiating a coherent irradiation light;

a scanning element scanning the irradiation light from the light source and sending it to an object under measurement;

a photo detector receiving the irradiation light modulated by being passed through the object under measurement in accordance with the scanning, and performing photoelectric conversion on the irradiation light; and a measuring unit obtaining phase information of the object under measurement based on a signal photoelectrically converted by the photo detector and a signal to be a reference for the scanning by the scanning element, and obtaining a measurement value regarding the object under measurement based on the phase information.

The operation of the first invention of the optical distance measuring apparatus will be described below.

In the present invention, the coherent irradiation light is irradiated from the light source, and the scanning element scans the irradiation light and sends it, as a scanning beam, to the object under measurement. Further, at least one photo detector receives the irradiation light modulated by being passed through the object under measurement, and performs the photoelectric conversion on the irradiation light. Further, the measuring unit obtains the phase information of the object under measurement based on the signal photoelectrically converted by the photo detector and the signal to be the reference for the scanning by the scanning element, and in accordance with this, it is possible to obtain the measurement value of the optical distance and the like based on the phase information.

Therefore, according to the present invention, it becomes possible to modulate the irradiation light by the scanning of the irradiation light by the scanning element for obtaining an image of the object under measurement, without modulating the irradiation light from the light source by using a special modulation element or separating one irradiation light into lights with two frequencies by using an acoustic optical device. That is, by irradiating the irradiation light to the object under measurement, the irradiation light can be easily modulated without using a special device or element, which enables to realize reduction in cost of the optical distance measuring apparatus.

As a result of the above, in a microscope to which the present invention is applied, it has a quite high in-plane resolution and moreover, an optical distance such as a height or a refractive index distribution regarding an object under measurement can be measured by performing two-dimensional scanning once. For this reason, three-dimensional measurement of a state change or the like of live cells, a micro-machine, or the like can be performed in real time. Specifically, the present invention has large characteristics incomparable to a conventional laser scanning type confocal microscope which obtains two-dimensional information and adds it up in a three-dimensional direction, or the like.

Moreover, when the present invention is applied to a transmitted type microscope, it is possible to perform, in visualization of cells, microorganisms, or the like, observation or measurement of the cells, the microorganisms, or the like in a living state and which are not stained with fluorescence, by using a simple apparatus at high speed and with high resolution. Accordingly, the present invention has large characteristics which are not present in electron microscopes with which cells or the like are inactivated and then measured.

From the foregoing, according to the present invention, it is possible to provide the optical distance measuring apparatus having a high resolution in a plane as well as a high resolution with respect to a height or a refractive index distribution outside the plane, and having an effectively high resolution and causing no loss of spatial frequency by accurately reproducing is spatial frequency information which an object under measurement has by obtaining a spatial frequency which cannot be obtained with an ordinary imaging optical system.

In addition, it is also possible to use the present invention, for education or hobbies, as a microscopic three-dimensional digitizer. For example, by using a three-dimensional printer of nowadays and the present invention in combination, it is possible to easily express progress of cell division or a three-dimensional image of an organ inside a cell of a microorganism as a three-dimensional model, in a living state and without performing processing such as staining.

Further, in the first invention, it is also possible to design such that a direction perpendicular to an optical axis direction of the irradiation light is set as a boundary line, and the photo detector is positioned by being displaced to any one side with respect to the boundary line, and receives the irradiation light passed through the object under measurement.

By designing as above, it is possible to securely obtain sufficient data from the irradiation light, even with one photo detector. Note that the reason why the photo detector is positioned by being displaced to any one side with respect to the boundary line, is because when the photo detector is positioned at a center of the optical axis, phases are reversed across the boundary line, which makes it difficult to obtain sufficient data from the irradiation light.

A second invention of an optical distance measuring apparatus includes:

a light source irradiating a coherent irradiation light;

a scanning element scanning the irradiation light from the light source and sending it to an object under measurement;

two photo detectors existing with a boundary line in a direction perpendicular to an optical axis direction of the irradiation light interposed therebetween, each receiving the irradiation light modulated by being passed through the object under measurement in accordance with the scanning, and performing photoelectric conversion on the irradiation light; and a measuring unit obtaining phase information of the object under measurement based on signals each photoelectrically converted by each of the two photo detectors and a signal to be a reference for the scanning by the scanning element, and obtaining a measurement value regarding the object under measurement based on the phase information.

If the irradiation light is received by each of the two photo detectors as described above, the one photo detector existing in one side region with respect to the optical axis and the other photo detector existing in a region on the opposite side of the one side region, can respectively receive a scanning beam as amounts whose phases are mutually reversed. Accompanying this, with the use of these photo detectors, it is possible to easily detect an optical distance from a phase difference of the scanning beam. For this reason, when the both photo detectors independently detect the phase differences, and then the measuring unit calculates an average value, it is also possible to obtain data with higher accuracy by reducing an influence of noise and the like.

Further, in the first invention and the second invention, it is also possible to design such that the photo detector is disposed in any region divided by the boundary line along the direction perpendicular to the optical axis direction of the irradiation light and a cross boundary line crossing the boundary line on the optical axis of the irradiation light.

By designing as above, the photo detector is positioned in only any of the divided regions being four divisions in total. Consequently, it becomes possible to employ a photo detector of smaller size and lower cost, and the measuring unit can obtain a required measurement value even with little phase information received by this small-sized photo detector.

On the other hand, in the first invention and the second invention, it can be considered that the scanning element is set to a two-dimensional scanning element scanning the irradiation light in two directions, is respectively, which are orthogonal to each other, and the irradiation light irradiated to the object under measurement by the scanning in at least one direction out of the two directions is modulated.

A third invention of an optical distance measuring apparatus includes:

a light source irradiating a coherent irradiation light;

a scanning element scanning the irradiation light from the light source and sending it to an object under measurement;

a controller connected to the scanning element, and operating an operation of the scanning element to control a scanning speed and a scanning range of the scanning element;

a photo detector receiving the irradiation light modulated by being passed through the object under measurement in accordance with the scanning, and performing photoelectric conversion on the irradiation light; and a measuring unit obtaining phase information of the object under measurement based on a signal photoelectrically converted by the photo detector and a signal which is issued by the controller and which becomes a reference for the scanning by the scanning element, and obtaining a measurement value regarding the object under measurement based on the phase information.

As described above, by designing such that the controller is connected to the scanning element, and the controller operates the operation of the scanning element to control the scanning speed and the scanning range, it is possible not only to obtain a two-dimensional image but also to perform measurement with an arbitrary modulation amount and in an arbitrary range, only by changing a setting of the controller.

Next, in the first invention to the third invention, it is also possible to design such that the measuring unit extracts a direct-current component and an alternating-current component from the signal photoelectrically converted by the photo detector, calculates, based on a differential signal of the is obtained alternating-current component or a signal as a result of performing Hilbert transform on the obtained alternating-current component, a main frequency component of the modulated signal, and compares this frequency with a spatial frequency which the object under measurement has. Accompanying this, by calculating the main frequency component of the scanned signal, and comparing this frequency with the spatial frequency which the object under measurement has, it becomes possible to correct an MTF value which the optical system has.

Further, in the first invention to the third invention, it is also possible to design such that the measuring unit turns an alternating-current component of the signal photoelectrically converted by the photo detector into digitalized data, and adjusts, by changing an addition amount of the data, a range of obtaining the measurement value regarding the object under measurement.

For example, a signal processing circuit housed in the measuring unit is set to perform, not analog signal processing, but digital signal processing. Further, the measuring unit extracts a direct-current component and an alternating-current component from the modulated signal obtained in accordance with the scanning from the photo detector. In accordance with the extraction of the direct-current component and the alternating-current component as described above, it is possible to detect a frequency of the alternating-current component.

From the foregoing, it is possible to correctly perform quantification of information regarding the optical distance which the object under measurement originally has. Note that the measurement value of the optical distance can be calculated from magnitudes of the direct-current component and the alternating-current component, and a phase signal of the alternating-current component. Further, according to the first invention to the third invention, the main spatial frequency which the object under measurement has can be grasped in a unit of pixel displaying three-dimensional is information, so that band emphasis can be performed not only on the information of the optical distance being the visualized three-dimensional information but also on an arbitrary spatial frequency. For this reason, it is also possible to easily extract a portion, which is desired to be emphasized and observed by an observer, such as a rough structure like a portion with low spatial frequency or a minute structure with high spatial frequency.

Further, a limit of lateral resolution which the optical system has corresponds to an upper limit of detectable frequency, so that it can be considered to sample the alternating-current component and the direct-current component at a frequency which is sufficiently higher than this upper limit frequency and is equal to or more than a frequency corresponding to an optical resolution, when digitalizing the data. Based on the sampled data, by adding data flowed in time-series, it is possible to reduce electrically or optically generated random noise. This consequently leads to improvement of accuracy of measurement data and reduction in noise when displaying a three-dimensional image.

Further, since the scanning speed is constant, by changing the number of data to be added, it also becomes possible to substantially change a range of displaying the image by enlarging or reducing a range of visual field, without changing the optical resolution. Therefore, it also becomes possible to express the range of visual field arbitrarily to a certain extent without substantially changing NA of an objective lens used for irradiation.

Further, if it is set that when the irradiation light passes through the object under measurement, the object under measurement reflects the irradiation light, the photo detector in the first invention receives the reflected light to perform the photoelectric conversion on the light. In this case, by disposing a beam splitter within an optical axis between the light source and the object under measurement, the irradiation light reflected by and returned from the object under measurement can be further reflected by the beam splitter and sent to the photo detector side.

Further, if it is set that when the irradiation light passes through the object under measurement, the irradiation light transmits through the object under measurement, the photo detector in the first invention disposed on the optical axis, for example, receives the transmitted light and performs the photoelectric conversion on the light.

As described above, in the optical distance measuring apparatus of the present invention, the coherent irradiation light is irradiated from the light source, and the scanning element scans the irradiation light and sends the light, as the scanning beam, to the object under measurement, thereby modulating the light. Further, one photo detector receives the irradiation light passed through the object under measurement, and performs the photoelectric conversion on the light. Therefore, the excellent effect is exhibited such that in accordance with the obtainment of the phase information of the object under measurement performed by the measuring unit based on the signal photoelectrically converted by the photo detector and the signal to be the reference for the scanning by the scanning element, it becomes possible to perform quantitative calculation of the optical distance and the like.

DETAILED DESCRIPTION OF THE PREFERRED EMBODIMENTS

Hereinafter, Embodiment 1 to Embodiment 4 of an optical distance measuring apparatus according to the present invention will be described in detail based on the respective drawings.

Embodiment 1

Figure 1:
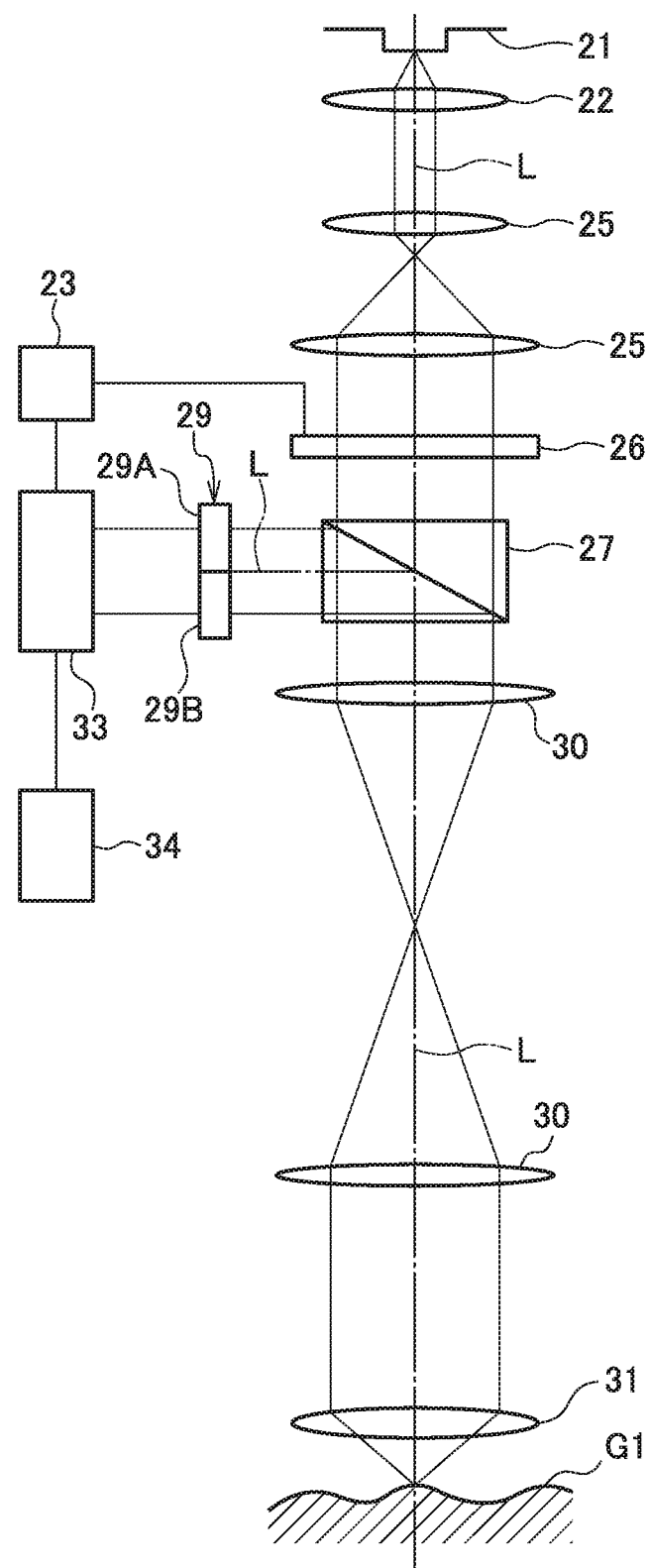
FIG. 1 is a block diagram of an apparatus of a reflective optical system to be Embodiment 1 of an optical distance measuring apparatus according to the present invention.

Embodiment 1 of the optical distance measuring apparatus according to the present invention will be described hereinafter while referring to FIG. 1 and FIG. 2. The present embodiment employs an apparatus of a reflective optical system which reflects a scanning beam by an object under measurement. FIG. 1 is a block diagram illustrating a configuration of the apparatus of the reflective optical system according to the embodiment.

As illustrated in FIG. 1, a laser light source 21 being a light source from which a laser light being a coherent irradiation light is irradiated (emitted), and a collimator lens 22 on which aberration correction is performed so that a collimated light can be obtained from the laser light, are disposed in sequence. Therefore, in the present embodiment, the laser light emitted from the laser light source 21 is turned into the collimated light by the collimator lens 22.

Further, a pupil transmission lens system 25 formed of two groups of lenses, a two-dimensional scanning device 26 being a two-dimensional scanning element which two-dimensionally scans input laser lights, and a beam splitter 27 which is originally used for separating and emitting input laser lights, are further disposed sequentially in line with respect to the collimator lens 22. Further, as illustrated in FIG. 1, an optical path of laser light directed to the pupil transmission lens system 25 is set to an optical axis L. Note that to the two-dimensional scanning device 26, a controller 23 being a control unit for changing a voltage or the like for controlling a scanning range and a scanning speed when performing two-dimensional scanning of the laser light, is connected.

Moreover, a pupil transmission lens system 30 formed of two groups of lenses is positioned adjacent to this beam splitter 27, and an objective lens 31 is disposed adjacent thereto by opposing an object under measurement G1. That is, these members are also lined up along the optical axis L. From the foregoing, the laser light passes through the pupil transmission lens system 25, the two-dimensional scanning device 26, the beam splitter 27, the pupil transmission lens system 30, and the objective lens 31, in this order, along the optical axis L, and then is irradiated to the object under measurement G1. At this time, because of the operation of the two-dimensional scanning device 26, the laser light is turned into the scanning beam to be two-dimensionally scanned on the object under measurement G1.

On the other hand, a photo detector group 29 formed of a plurality of light sensors, is disposed at a position adjacent to the beam splitter 27 in a direction orthogonal to the direction in which the optical axis L passes. Further, the scanning beam reflected by the object under measurement G1 illustrated in FIG. 1 is turned into a diffracted light, and returns by passing through the objective lens 31, the pupil transmission lens system 30, and the beam splitter 27, in this order, to be turned into a collimated light. Accompanying this, the light is reflected by the beam splitter 27, and is incident on the photo detector group 29 along an optical axis L of irradiation light which is orthogonal to the original optical axis L.

Note that the photo detector group 29 is not only disposed on a surface of far field of the object under measurement G1, but also formed of two photo detectors 29A, 29B, in the present embodiment. However, as illustrated in FIG. 2, these photo detectors 29A, 29B are respectively disposed with a boundary line S interposed therebetween, the boundary line S being positioned on a surface which is substantially perpendicular to a direction along the optical axis L to be a center of a spot of a scanning beam LA, and passing through the optical axis L. Specifically, the photo detector 29A is positioned by being displaced to one side with respect to the boundary line S, the photo detector 29B is positioned by being displaced to the opposite side of the photo detector 29A across the boundary line S, and each of these photo detectors 29A, 29B receives the scanning beam LA passed through the object under measurement G1 by being reflected by the object under measurement G1.

Further, each of the photo detectors 29A, 29B is structured to have a not-illustrated photoelectric conversion unit, and each of the photo detectors 29A, 29B receives the scanning beam LA and performs photoelectric conversion on the beam. Each of the respective photo detectors 29A, 29B, and the aforementioned controller 23 which operates the operation of the two-dimensional scanning device 26, is connected to a signal comparator 33. Accompanying this, the signal comparator 33 obtains phase information of the object under measurement G1 based on signals from the respective photo detectors 29A, 29B, and a signal issued by the controller 23. Further, this signal comparator 33 is connected to a data processing unit 34 which finally processes data to obtain the measurement value of the profile and the like of the object under measurement G1. For this reason, in the present embodiment, these signal comparator 33 and data processing unit 34 are set to function as a measuring unit.

Further, the laser light source 21 is a semiconductor laser, and generates a coherent laser light. This laser light is turned into a parallel luminous flux by the collimator lens 22, which is made to be incident on the pupil transmission lens system 25. At this time, an incident beam diameter of the laser light is made appropriate in relation with the pupil transmission lens system 25 by using an aperture mechanism (not illustrated) or the like.

Here, the pupil transmission lens system 25 disposed between the collimator lens 22 and the two-dimensional scanning device 26 is an optical system for transmitting an emission surface position of the collimator lens 22 in a conjugate manner to the next two-dimensional scanning device 26. The laser light passed through this pupil transmission lens system 25 passes through the two-dimensional scanning device 26 to be turned into a scanning beam, which is sent to the beam splitter 27. The scanning beam from the beam splitter 27 is incident on the objective lens 31 through the pupil transmission lens system 30, which is conjugate to the pupil position of the objective lens 31.

From the foregoing, in the present embodiment, the laser light in an unmodulated state is irradiated from the laser light source 21, but, the laser light after being turned into the scanning beam by the two-dimensional scanning device 26 is incident on the object under measurement G1 and is substantially modulated and reflected, and a modulated signal of Fourier transform pattern of the scanning beam is finally detected by the photo detector group 29.

Figure 3:
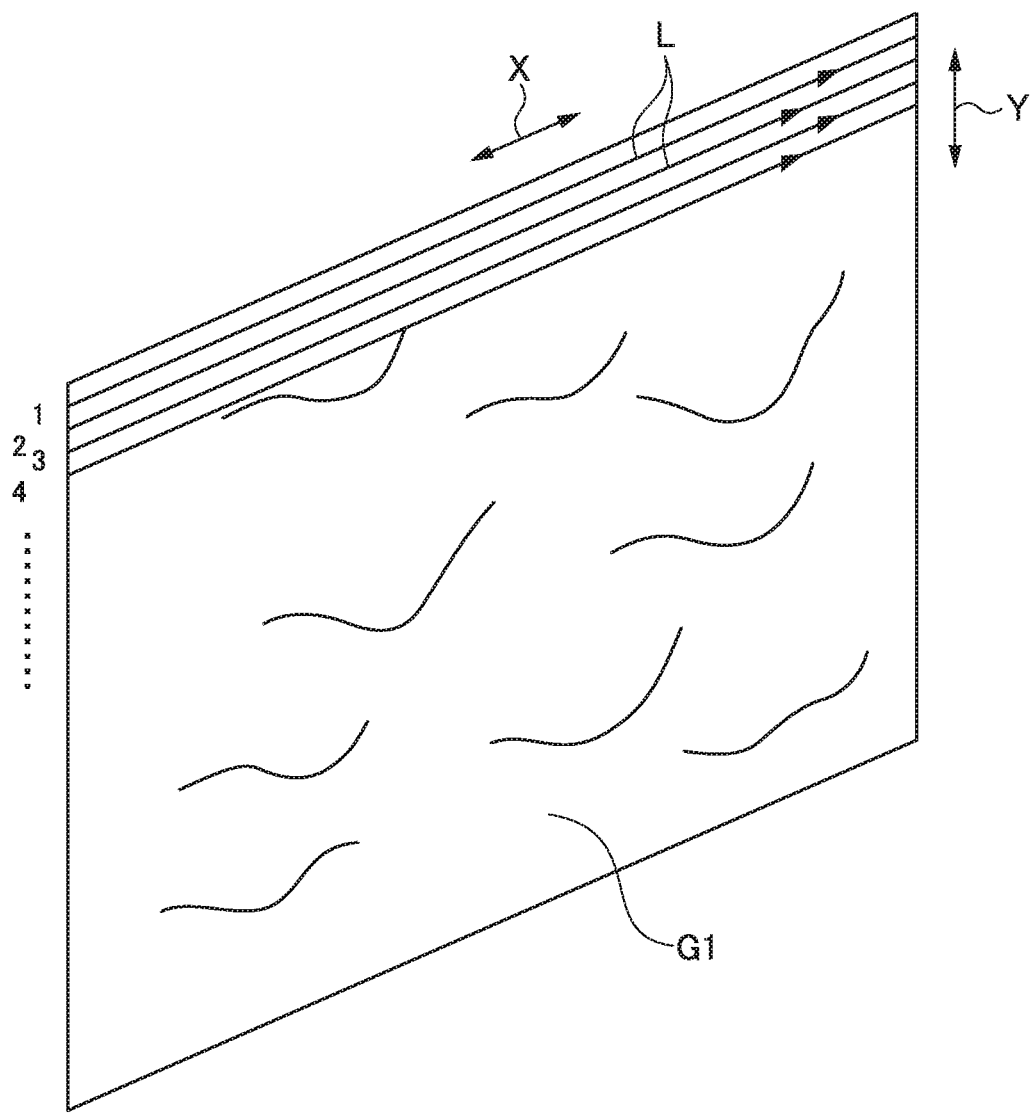
FIG. 3 is a perspective view explaining repetitive scanning of laser lights.

Further, as illustrated in FIG. 3, the two-dimensional scanning device 26 repeatedly scans the laser lights on the object under measurement G1 along a horizontal direction X, while moving the optical axis L. Note that at the time of the repetition, the scanning position is sequentially changed along a perpendicular direction Y as indicated by 1, 2, 3, 4 . . . in FIG. 3, thereby enabling the two-dimensional scanning. Further, the controller 23 which controls the operation of the two-dimensional scanning device 26 can change the range of visual field of the present apparatus. Specifically, when the controller 23 changes the voltage for controlling the scanning range in the horizontal direction of the two-dimensional scanning device 26, or the scanning range in the perpendicular direction, it becomes possible to adjust the range of visual field by freely enlarging or reducing a three-dimensional image. Note that at this time, the controller 23 can change only the range of visual field while keeping the lateral resolution constant.

As described above, the unmodulated laser light from the laser light source 21 is scanned by the two-dimensional scanning device 26, and a phase difference between a signal to be a reference for modulation substantially applied to the laser light and a modulated signal which the scanning beam reflected and modulated by the object under measurement G1 has, can be detected by the signal comparator 33 as a phase displacement of an electrical modulated signal frequency difference. The phase displacement at this time corresponds to a phase difference between a zero order diffracted light and a high order diffracted light, as will be described later. At this time, it is of course possible that both of the photo detectors 29A, 29B respectively receive lights and perform photoelectric conversion on the lights, but, it is possible that the phase information being the information of the phase displacement can be detected by using only the photo detector positioned on one side of the two divided light-receiving areas in which the boundary line S passing through the optical axis L illustrated in FIG. 2 is set as the boundary, which is one characteristic of the present embodiment.

Figure 2:
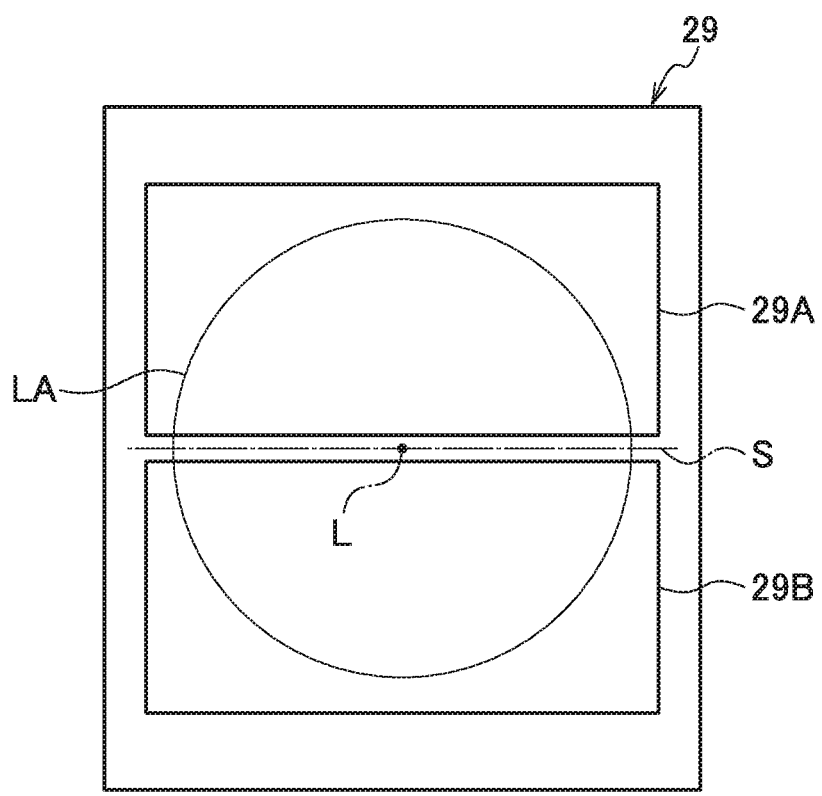
FIG. 2 is an explanatory diagram representing a light irradiation area on a photo detector of the reflective optical system in FIG. 1.

The reason why the phase information can be detected only on one side of the two divided light-receiving areas as described above is because, when the direction substantially perpendicular to the direction of the optical axis L of the objective lens 31 illustrated in FIG. 2 is set as the boundary line S, the phase information can be sufficiently detected only by the one photo detector 29A positioned on one side divided by the boundary line S, or the phase information can be sufficiently detected, in a similar manner, only by the other photo detector 29B positioned on the other side. It is of course possible that both of the photo detectors 29A, 29B simultaneously detect the information. However, phases of lights diffracted by the object under measurement G1 to reach the respective photo detectors 29A, 29B are reversed between the photo detectors 29A and 29B with the optical axis L set as a boundary therebetween. Therefore, based on signals of respective pieces of phase information having mutually reverse phases and photoelectrically converted by the photo detectors 29A, 29B, the signal comparator 33 compares the signals with the signal issued by the controller 23, data is finally processed, and the data processing unit 34 obtains the measurement value of the optical distance such as the profile of the object under measurement G1.

Specifically, the signal comparator 33 obtains the phase information of the object under measurement G1 based on the signals as a result of performing photoelectric conversion on the scanning beam reflected by the object under measurement G1 described above and the signal which becomes a reference for the scanning beam and which is issued by the controller 23 to instruct the scanning, and the phase information is sent to the data processing unit 34 formed of a CPU, a memory, and the like, and connected to the signal comparator 33. Accompanying this, the data processing unit 34 records this phase information together with scanning information with respect to a flat surface, which enables to easily derive the measurement value of the profile information and the like regarding the surface of the object under measurement G1.

From the foregoing, according to the present embodiment, there is provided the optical distance measuring apparatus having a high resolution in a plane as well as a high resolution with respect to a height or a refractive index distribution outside the plane, and having an effectively high resolution and causing no loss of spatial frequency by accurately reproducing spatial frequency information which the object under measurement G1 has by obtaining a spatial frequency which cannot be obtained with an ordinary imaging optical system.

Accompanying this, by using the present optical system as described above, it becomes possible to obtain three-dimensional measurement data every time two-dimensional scanning is performed. Accordingly, by using the present optical system, a change in the state of a cell or a microorganism, a transient change in surface state and internal state of the cell or the microorganism in accordance with the change in the state, or the like can be observed or measured at high speed. Therefore, it is also possible to display a three-dimensional image by using a commercialized autostereoscopic display, three-dimensional display using a pair of polarized glasses, or the like, and thus it can be made as a useful apparatus in education, study, medical care, and the like.

Note that although an example of using one two-dimensional scanning device 26 illustrated in FIG. 1 is described in the present optical system, in an application which needs simple data of only one direction, similar effects can be obtained when this two-dimensional scanning device is replaced with a one-dimensional scanning device. As the one-dimensional scanning device, a galvano mirror, a resonant mirror, a rotating polygon mirror, or the like can be employed.

Further, by preparing, in place of one two-dimensional scanning device 26, two independent one-dimensional scanning devices for X is direction and Y direction which are orthogonal to each other, respectively, and disposing them in front of and behind the pupil transmission lens system 25, respectively, it is possible to realize a function similar to that of the two-dimensional scanning device 26. Note that a micro-mirror device using the technology of micro-machine, for example, may also be employed. As this micro-mirror device, ones for both one-dimensional use and two-dimensional use are known and commercialized. Further, it is also possible to employ a structure in which one one-dimensional scanning device and a not-illustrated table supporting the object under measurement G1 are set in a form of being orthogonal to each other.

As described above, it is possible to quantitatively calculate the optical distance from the phase information of the object under measurement G1 based on the signal as a result of performing photoelectric conversion on the scanning beam by the photo detector group 29 and the signal which is issued by the controller 23 and which becomes the reference for the scanning by the two-dimensional scanning device 26.

Embodiment 2

Next, Embodiment 2 of the optical distance measuring apparatus according to the present invention will be described hereinafter while referring to FIG. 4. The present embodiment employs an apparatus of a transmitted optical system in which a scanning beam transmits through an object under measurement.

Figure 4:
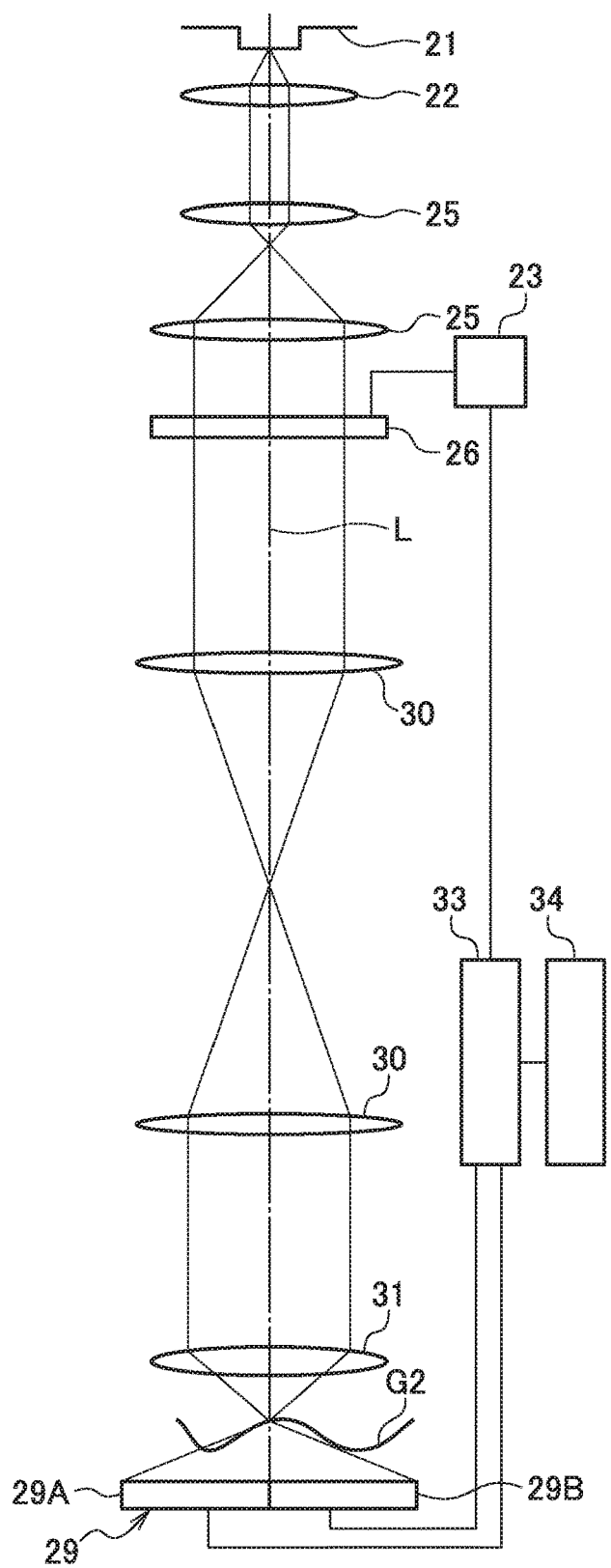
FIG. 4 is a block diagram of an apparatus of a transmitted optical system to be Embodiment 2 of the optical distance measuring apparatus according to the present invention.

FIG. 4 is a block diagram illustrating the apparatus of the transmitted optical system according to the present embodiment. The major part of the optical system is the same as the apparatus of the reflective optical system described above, and thus is omitted from description. In the apparatus of the transmitted optical system, when compared with Embodiment 1, the lights gathered at the objective lens 31 transmit through an object under measurement G2.

Further, in the present embodiment, since the transmitted optical system is employed, the beam splitter 27 is not necessary, and in accordance with this, the photo detector group 29 is disposed at a position on the opposite side of the objective lens 31 with the object under measurement G2 interposed therebetween. Note that in a similar manner to Embodiment 1, this photo detector group 29 is not only disposed on a surface of far field of the object under measurement G2, but also formed of two photo detectors 29A, 29B.

Specifically, in the case of the present apparatus of the transmitted optical system, the photo detector group 29 is disposed on an extension line of the optical axis L of the objective lens 31, as illustrated in FIG. 4. Further, in a similar manner to Embodiment 1, the photo detectors 29A, 29B are respectively positioned with a boundary line S interposed therebetween, the boundary line S being positioned on a surface which is substantially perpendicular to a direction along the optical axis L to be a center of a spot of a scanning beam LA, and passing through the optical axis L. From the above, the photo detector 29A is positioned by being displaced to one side with respect to the boundary line S, and the photo detector 29B is positioned by being displaced to the opposite side of the photo detector 29A across the boundary line S. Accompanying this, also in the apparatus of the transmitted optical system in FIG. 4, phases become substantially equal in a spatial manner on the photo detector group 29, similarly to the apparatus of the reflective optical system in FIG. 1.

Therefore, in a similar manner to Embodiment 1, based on signals of pieces of phase information photoelectrically converted by the photo detectors 29A, 29B, respectively, which form the photo detector group 29, and the signal which is issued by the controller 23 and which becomes the reference for the scanning by the two-dimensional scanning device 26, the signal comparator 33 obtains phase information of the object under measurement G2. Data is finally processed, and the data processing unit 34 can obtain a measurement value of the optical distance such as the profile of the object under measurement G2. As a result of this, according to the present embodiment, it also becomes possible to provide the optical distance measuring apparatus having an effectively high resolution and causing no loss of spatial frequency.

In particular, in the apparatus of the transmitted optical system as in the present embodiment, a state change of live cells can be observed in real time non-invasively without staining, so that the apparatus can serve a large role for examination of properness of iPS or ES cells, examination of the presence/absence of cancer cells, and the like. This is a quite different characteristic from a measuring device which has a high magnification but is only able to perform observation of a living organism in a dead state, such as an electron microscope.

Figure 5:
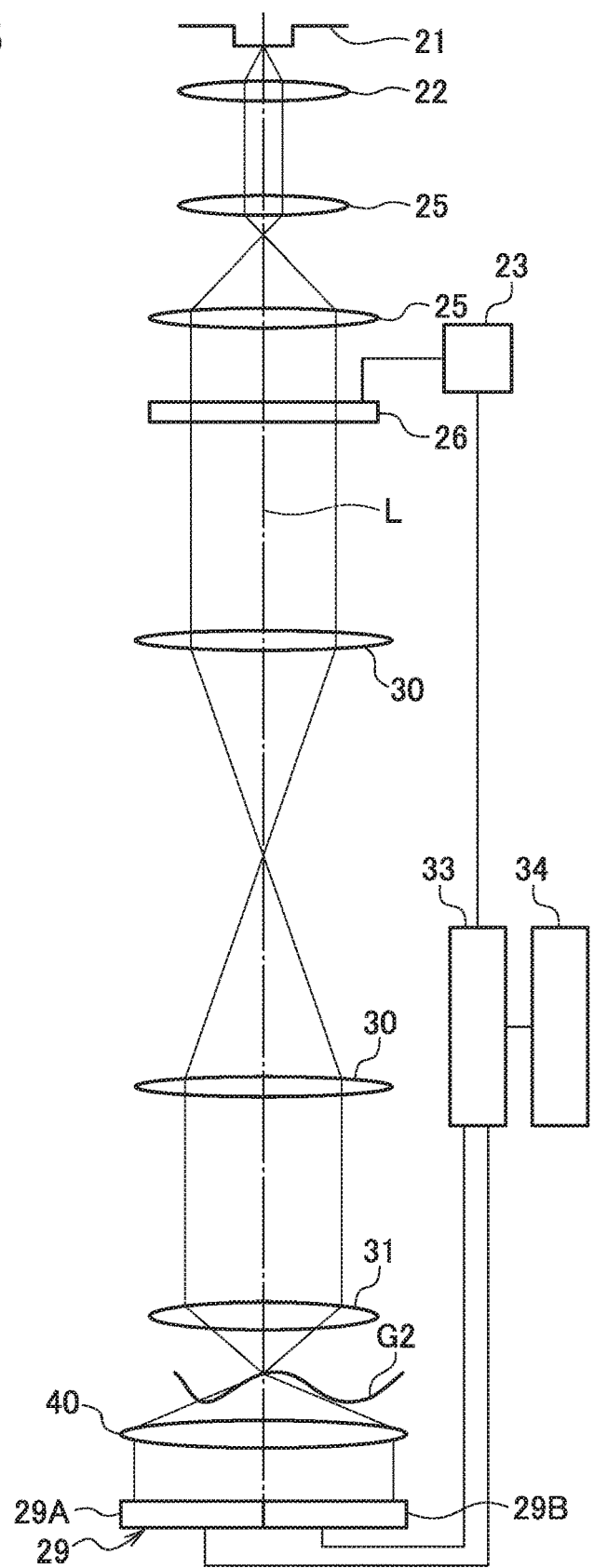
FIG. 5 is a block diagram of an apparatus of a transmitted optical system to be a modified example of Embodiment 2.

On the other hand, as a modified example of the present embodiment, it can be considered to dispose a lens 40 at a position behind the object under measurement G2, which is on the opposite side of the objective lens 31 with the object under measurement G2 interposed therebetween, and in front of the photo detector group 29, as illustrated in FIG. 5. Specifically, a scanning beam to be a diffracted light from the object under measurement G2 is turned into a collimated light by the lens 40, and then led to the photo detector group 29. For this reason, in the present embodiment, a Fourier transform pattern of the scanning beam transmitted through the object under measurement G2 is turned into the collimated light by the lens 40, and received by the photo detector group 29, as illustrated in FIG. 5. Note that it is also possible to gather lights by the lens 40 to lead the scanning beam to the photo detector group 29.

Next, description will be made regarding that what kind of information is brought about by the scanning beam transmitted through the object under measurement.

For simplicity of description, if the object under measurement being a sample is assumed to be in the form of a sine wave with a height h and a pitch d, an optical phase θ is represented by the following equation.

$$\theta = 2\pi(h/\lambda)\sin(2\pi x/d - \theta 0) \quad \text{Equation (1)}$$

An amplitude E of a light diffracted by the object under measurement is given as a convolution of Fourier transform of the equation (1) and an aperture of the objective lens 31 on a plane separated by a focal length f, and thus is represented as follows. Note that the Bessel function which is Fourier transform of the phase of the equation (1) takes up to the positive and negative first order.

Equation (2)

$$E = \int \left\{ J_0\left(2\pi\frac{h}{\lambda}\right)\delta(X) + J_1\left(2\pi\frac{h}{\lambda}\right)\left(e^{-j\theta_0}\delta\left(X - \frac{\lambda f}{d}\right) - e^{j\theta_0}\delta\left(X + \frac{\lambda f}{d}\right)\right)\right\}$$
$$rect\left(\frac{x-X}{2a}\right)dX$$

$$= J_0\left(2\pi\frac{h}{\lambda}\right)rect\left(\frac{x}{2a}\right) + J_1\left(2\pi\frac{h}{\lambda}\right)\left(e^{-j\theta_0}rect\left(\frac{x-\frac{\lambda f}{d}}{2a}\right) - e^{j\theta_0}rect\left(\frac{x+\frac{\lambda f}{d}}{2a}\right)\right)$$

It is possible to generalize and consider this equation (2). Specifically, in the phase pattern, the above-described pitch d can be considered as an aggregate of various pitches, so that when a phase difference between an amplitude $M_0$ of a zero order diffracted light and an amplitude $M_1$ of a first order diffracted light with respect to the zero order diffracted light is set as $\theta_0$, the amplitude E of light is given as follows. In a positive region of spatial frequency, the amplitude E of light is represented by the following equation (3), and further, in a negative region of spatial frequency, the amplitude E of light is represented by the following equation (4).

$$E = M_0 + M_1 e^{-j\theta_o} \quad \text{Equation (3)}$$

$$E = M_0 - M_1 e^{j\theta_o} \quad \text{Equation (4)}$$

This is because positive and negative first order diffracted lights of the light diffracted by the object under measurement qualitatively and constantly have mutually opposite phases with respect to the zero order diffracted light. Here, the diffracted light in each of the equation (3) and the equation (4) is received by the respective photo detectors 29A, 29B, of the photo detector group 29, respectively disposed in two divided regions with the boundary line S interposed therebetween, the boundary line S being positioned on a surface which is substantially perpendicular to a direction along the optical axis L, and passing through the optical axis L.

Here, in the above-described embodiment, the laser light as a result of oscillating the laser light source 21 being the semiconductor laser to emit a fixed amount of light is irradiated while being scanned on the object under measurement G1, G2, as a scanning beam having a speed v, by the two-dimensional scanning device 26. By the diffracted light at a part of the object under measurement G1, G2, E can be represented as the following equation in any one side of the photo detector group 29, which is, for example, the photo detector 29A. Here, $E_0$ indicates an amplitude of light. Further, although the photo detector 29A is employed in this description, the same applies to the photo detector 29B.

$$E = E_0(M_0 + M_1 e^{-j\theta_o})$$

Therefore, intensity I observed by the photo detector 29A, for example, in the photo detector group 29, is represented by the following equation (5). Here, $I_0$ indicates intensity of irradiated light.

$$I = EE^* \quad \text{(Equation 5)}$$
$$= I_0(M_0^2 + M_1^2 + 2M_0M_1\cos\theta 0)$$

Further, the scanning beam is scanned at the speed v with respect to the object under measurement G1, G2, so that an initial phase $\theta 0$ becomes $\theta 0 = 2\pi vt/d = 2\pi ft$. This means that the signal received and photoelectrically converted by the photo detector 29A, is a result of conversion of a spatial frequency 1/d which the object under measurement G1, G2 has into an electrical frequency f.

Next, the equation (5) regarding the intensity I of the photoelectrically converted electrical signal is substantially separated into a direct-current component and an alternating-current component. This separation can be carried out through smoothing operation by a capacitor or the like, or by performing A/D conversion and then digital processing. As a result of this, a direct-current component DC and an alternating-current component AC can be obtained through the following equation (6) and equation (7).

$$DC = I_0(M_0^2 + M_1^2) \quad \text{Equation (6)}$$

$$AC = 2I_0 M_0 M_1 \cos(2\pi ft) \quad \text{Equation (7)}$$

If an ordinary cell or transparent material is set as the object under measurement G1, G2, a refractive index difference between a surrounding medium and the object under measurement G1, G2 is very small, so that intensity of a high order diffracted light including a first order diffracted light is very small, when compared to intensity of a zero order diffracted light. For this reason, it can be regarded that M0>M1, and in accordance with this, the equation (6) and the equation (7) become the following equation (8) and equation (9).

$$DC = I_0 M_0^2 \quad \text{Equation (8)}$$

$$AC = 2I_0 M_0 M_1 \cos(2\pi ft) \quad \text{Equation (9)}$$

Next, two operations are applied to the alternating-current component AC.

Concretely, by making the electrical signal obtained by the photo detector 29A pass through an element of 90-degree phase shifter, allowing the electrical signal to be subjected to A/D conversion and then Hilbert transform, or the like, the following equation (10) can be obtained. Further, by making the signal of the alternating-current component AC pass through a differentiation circuit or by obtaining a digital difference, the following equation (11) can be obtained.

$$Ach = -2I_0 M_0 M_1 \sin(2\pi ft) \quad \text{Equation (10)}$$

$$ACd = -2I_0 M_0 M_1 (2\pi f)\sin(2\pi ft) \quad \text{Equation (11)}$$

Further, by obtaining a ratio between the signal in the equation (10) and the signal in the equation (11), it is possible to obtain $\varepsilon = 2\pi f$. Further, by making a signal of Ach pass through a differentiation circuit or by obtaining a digital difference, the following equation (12) can be obtained.

$$Achd = -2I_0 M_0 M_1 (2\pi f)\cos(2\pi ft) \quad \text{Equation (12)}$$

On the other hand, by obtaining a ratio between the signal in the equation (12) and the signal in the equation (9), it is also possible to obtain $\varepsilon = 2\pi f$, in a similar manner. However, at this time, denominators of two $\varepsilon$ are a sine function and a cosine function, so that when calculation is performed based on either of the above, a value sometimes becomes infinite. For this reason, through a method such that one whose denominator is closer to 0 is not employed, or the like, it is possible to avoid a problem regarding divergence to increase a calculation accuracy.

From the foregoing, when the phase information in the equation (1) is represented again, it can be represented as the following equation (13).

$$e^{j\theta} = J0 + J1(e^{j\theta} - e^{-j\theta}) \quad \text{Equation (13)}$$

Here, $\theta = 2\pi x/d - \theta 0$, and since $\theta 0$ indicates the initial phase, when this $\theta 0$ is ignored, it can be described as $\theta = 2\pi ft$.

At this time, it is possible to represent that f=v/d, so that the frequency f and the spatial frequency 1/d are in a proportional relation.

With respect to the above, a value which is tried to be determined, is a value obtained through the following equation (14) based on the equation (13).

$$e^{j\theta} = J0 + 2J1j \sin\theta \qquad \text{Equation (14)}$$

As described above, if the ordinary cell or transparent material is set as the object under measurement G1, G2, the refractive index difference between the surrounding medium and the object under measurement G1, G2 is very small, so that the intensity of the high order diffracted light including the first order diffracted light is very small, when compared to the intensity of the zero order diffracted light. This corresponds to that, in a phase term in the equation (13), a zero order Bessel function takes a large value, and a value of second and succeeding order can be ignored. Therefore, such an equation (14) can be represented, and the following equation is determined based on the equation (14).

$$\tan\theta = \frac{2J1\sin\theta}{J0}$$

Here, when the object under measurement G1, G2 composed of, not a single spatial frequency, but various spatial frequencies, is considered, this equation can be generalized as the equation (3) and the equation (4).

Specifically, it is only required to finally determine a phase in the following equation (15).

$$\tan\theta = \frac{2M1\sin\theta}{M0} \qquad \text{Equation (15)}$$

Further, from an equation of $\theta = (2\pi/\lambda)nh$, an optical distance nh can be calculated. For example, it is possible to determine the optical distance nh through calculation of the equation (15) based on the equation (8) and the equation (10). These operations can also be carried out by performing is Hilbert transform a plurality of times or by performing differential operation or difference operation a plurality of times.

Figure 6:
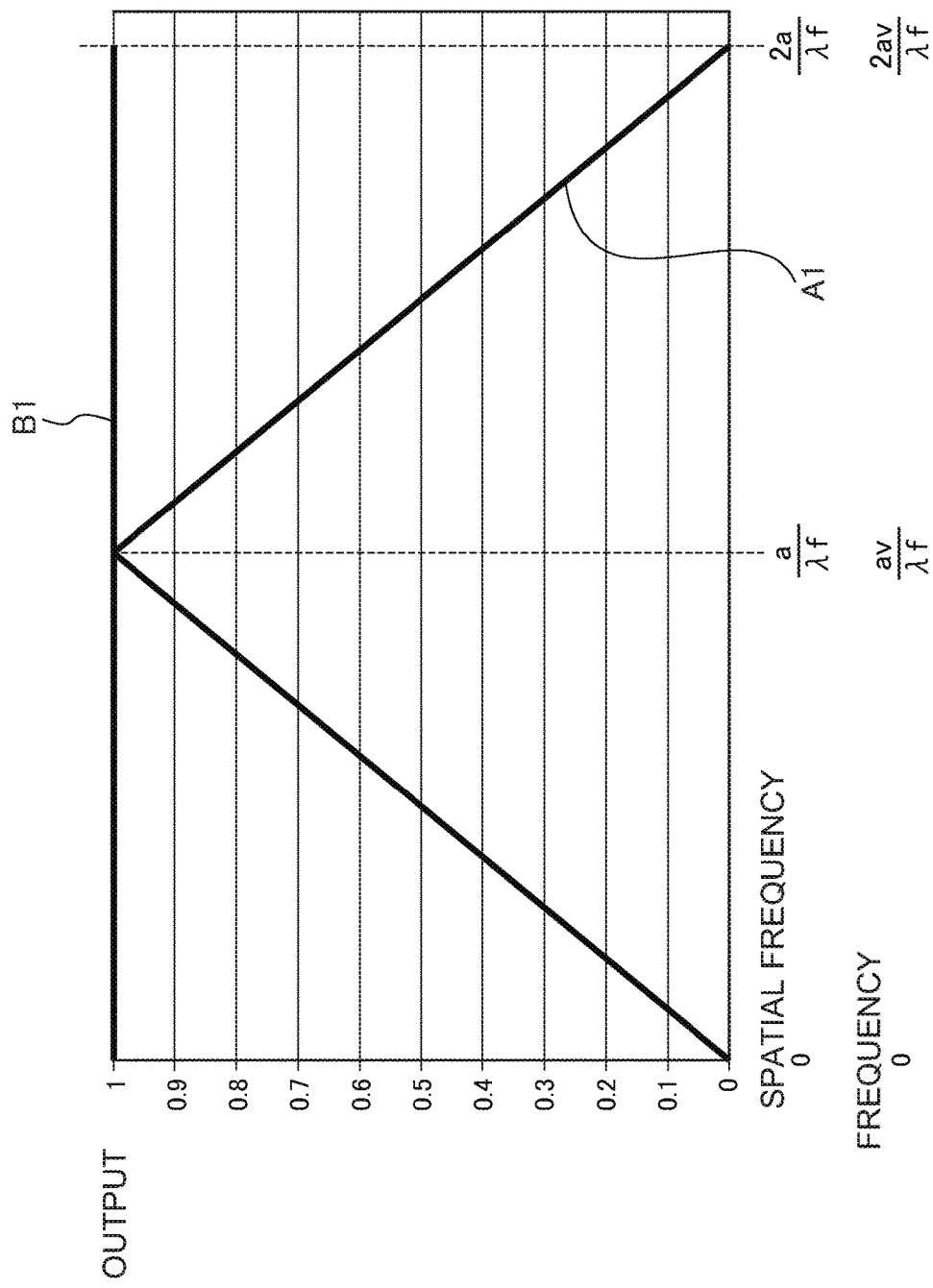
FIG. 6 is a diagram illustrating an MTF curve of a spatial frequency obtained by a photo detector in the optical distance measuring apparatus of the present invention.

As described above, it is possible to mathematically determine the equation (15), but, optically, regarding $M_0$ and $M_1$, the spatial frequency capable of being obtained by the lens is limited. The photo detector 29A, for example, is disposed on one side with respect to the optical axis L of the objective lens 31 being the boundary, and if a spatial frequency being a half of a cut-off frequency is defined as an intermediate frequency (a/λf), the spatial frequency capable of being obtained by this photo detector 29A is represented as a solid line A1 in a graph illustrated in FIG. 6 which represents a so-called MTF curve.

Concretely, the spatial frequency increases from a low band where the spatial frequency is zero toward the intermediate frequency (a/λf), and the spatial frequency decreases from the intermediate frequency toward a high band where the spatial frequency is 2a/λf.

This is because only the interference between the zero order diffracted light and the first order diffracted light contributes to the degree of modulation. Specifically, in a range from the low band to the intermediate frequency, a part where the zero order diffracted light and the positive and negative first order diffracted lights overlap is generated, but, this part does not contribute to the degree of modulation, and in a range from the intermediate frequency to the high band, a part where the zero order diffracted light and the first order diffracted light overlap decreases. Here, a indicates a radius of aperture of the objective lens 31, f indicates a focal length of the objective lens 31, and further, λ indicates a wavelength of laser light.

Further, as described above, the frequency is calculated based on ε, and since the scanning speed is previously known, the calculated frequency represents the whole spatial frequency configuring the pattern. Therefore, it is also possible to perform measurement in real time along the scanning is direction by a main pitch of pattern being a reciprocal of the spatial frequency.

Here, if the laser light is irradiated to the object under measurement G1, G2 while performing scanning at the speed v, to thereby obtain information, the frequency is modulated in accordance with the scanning as described above, and this frequency is in a proportional relation with the spatial frequency. Therefore, the frequency calculated as ε represents the scanning spatial frequency, and it is set that a frequency which cannot be obtained by an optical system such as a lens is applied to the MTF curve in FIG. 6, and conversion such as one in which the MTF curve is flattened as a solid line B1, is performed for each obtained data. As a result of this, a gain of the obtained spatial frequency is updated at any time, and with this method, it becomes possible to calculate a correct optical distance in real time.

On one hand, for the purpose of improving the lateral resolution, there has been known a method of realizing improvement of MTF by disposing an optical system tilted with respect to the optical axis L of the objective lens 31, and by overlapping, in this tilted optical system, a part of a zero order diffracted light and a first order diffracted light having a high spatial frequency, the method being disclosed in Japanese Patent Application Laid-open No. 2015-4643, and the like, for example. Also in this method, since it is previously known that what the MTF curve would be, it becomes possible to perform correction on a higher spatial frequency with the above-described method. This makes it possible to measure an optical distance with high reliability with respect to even the object under measurement G1, G2 which is required to increase the lateral resolution.

On the other hand, the measurement of frequency can be performed for each scanning pixel, so that an observer who observes the object under measurement G1, G2 can easily set the spatial frequency and the like to be is emphasized, emphasize a portion wanted to be observed, and display a portion such as one hidden by a background. The spatial frequency can be easily changed in a flexible manner as described above, and in accordance with this, by previously setting such that a band of spatial frequency is divided into several bands, and an observer can set a gain in each band in a manual manner or the like, it becomes possible to freely apply a kind of equalizing operation to an image.

Further, a limit of lateral resolution which the optical system has corresponds to an upper limit of detectable frequency, so that by performing sampling at a frequency which is sufficiently higher than this upper limit frequency, and based on the sampled data, by adding data flowed in time-series, it is possible to reduce random noise. This consequently leads to improvement of accuracy of measurement data and reduction in noise when displaying a three-dimensional image. Further, since the scanning speed is constant, by changing the number of data to be added, it becomes possible to substantially change a range of displaying the image. Therefore, it becomes possible to enlarge or reduce the range of visual field arbitrarily to a certain extent without substantially changing NA of the objective lens used for irradiation.

Specifically, with this method, there is provided a large characteristic that only the range of visual field can be changed while keeping the lateral resolution constant. Further, if a function of changing the scanning range by changing a voltage for controlling the scanning range in the horizontal scanning direction with respect to a MEMS, a resonant mirror, or the like, being a scanning element, is used in combination with this method, the enlargement or reduction of the three-dimensional image can be performed more freely without changing the lateral resolution.

Note that generally, the refractive index difference is very small, so that it is set that $M_1 < M_0$, but, more concretely, it is also possible that a ratio between the equation (9) and the equation (10) is calculated, the amount of $2\pi ft$ is substituted into the equation (7), and based on the equation (6) and the equation (7), $M_1/M_0$ is determined. Further, by modulating the irradiation light to be the laser light by the scanning, in one side of regions disposed on a far field separated from the object under measurement G1, G2, and divided with the boundary line S interposed therebetween, the boundary line S being positioned on the surface which is substantially perpendicular to the direction along the optical axis L, and passing through the optical axis L, the photo detector 29A receives this scanning beam to detect (photoelectrically convert) the scanning beam, resulting in that the optical distance of the object under measurement G1, G2 can be easily detected.

On the other hand, in a region on the opposite side of the above-described region divided by the boundary line S, the photo detector 29B can receive the scanning beam as an amount whose phase is reversed, and detect (photoelectrically convert) the scanning beam. For this reason, when the pieces of phase information of both of the regions are independently detected, and then the average value of these pieces of phase information is calculated, it is possible to reduce the influence of noise and the like.

In particular, in order to visualize an object made of a substance whose refractive indices are slightly different, such as a cell, an extremely weak detection signal is obtained, so that there is a need to suppress a noise as much as possible and to amplify the signal. In such a case, it is required to obtain the signal in a frequency region separated as far as possible from a band of noise.

As described above, it is possible to easily visualize a phase object from the signal based on the scanning and the signals detected by the photo detector 29A and the photo detector 29B. Further, by appropriately processing the signals, it is possible not only to calculate the measurement value but also to identify the obtained spatial frequency. Based on this, it is possible to reproduce the spatial frequency which the object under measurement originally has, and to calculate the optical distance of the object under measurement more correctly.

Further, in the case of the transmitted optical system, since it is possible to realize the visualization of cells, microorganisms, or the like, with a simple apparatus according to the above-described embodiment, the optical system can be used for education or hobbies, as a microscopic three-dimensional digitizer. If it is designed as above, by using a three-dimensional printer of nowadays and the apparatus according to the above-described embodiment in combination, it is possible to easily express progress of cell division or a three-dimensional image of an organ inside a cell of a microorganism as a three-dimensional model, in a living state and without performing processing such as staining.

Embodiment 3

Figure 7:
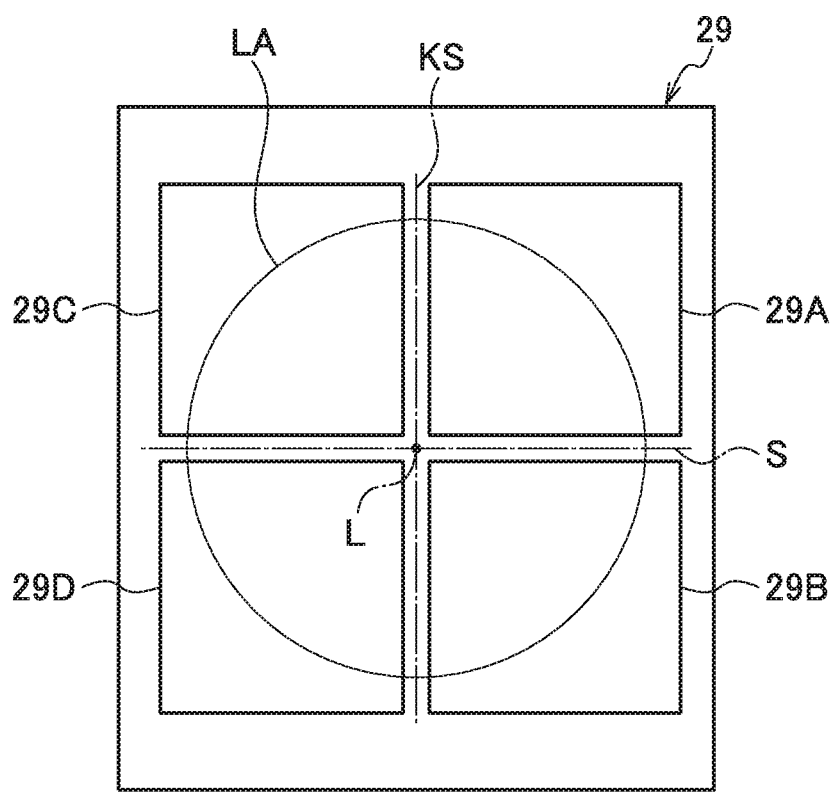
FIG. 7 is an explanatory diagram representing a light irradiation area on a photo detector of an apparatus to be Embodiment 3 of the optical distance measuring apparatus according to the present invention.

Next, Embodiment 3 of the optical distance measuring apparatus according to the present invention will be described hereinafter while referring to FIG. 7. The present embodiment can be applied to an apparatus of a reflective optical system and an apparatus of a transmitted optical system.

In Embodiments 1, 2, the photo detectors 29A, 29B forming the photo detector group 29 are respectively positioned in the two divided regions with the boundary line S interposed therebetween, the boundary line S being positioned on the surface which is substantially perpendicular to the direction along the optical axis L of the scanning beam LA, and passing in through the optical axis L. On the contrary, the present embodiment employs four divided photo detectors 29A to 29D illustrated in FIG. 7, so that they can obtain respective pieces of information in a horizontal direction and a perpendicular direction within a plane of the object under measurement G1, G2.

Specifically, it is set that the photo detectors 29A to 29D are disposed in respective regions divided by the boundary line S and a cross boundary line KS crossing the boundary line S on the optical axis L of the irradiation light. Further, by individually obtaining respective pieces of information in a horizontal direction and a perpendicular direction within a plane of the object under measurement G1, G2 using these four photo detectors 29A to 29D, it is possible to obtain more specific data. Further, in addition to this, it also becomes possible to sufficiently obtain phase information even with any one of photo detector out of these photo detectors. Accompanying this, it also becomes possible to employ a photo detector of smaller size and lower cost, and the measuring unit can obtain a required measurement value even with little phase information received by this small-sized photo detector. Note that in the present embodiment, the region is divided into four, but, it is also possible to structure such that the region is divided into four or more, and four or more photo detectors are employed.

Embodiment 4

Embodiment 4 of the optical distance measuring apparatus according to the present invention will be described hereinafter while referring to FIG. 8.

Figure 8:
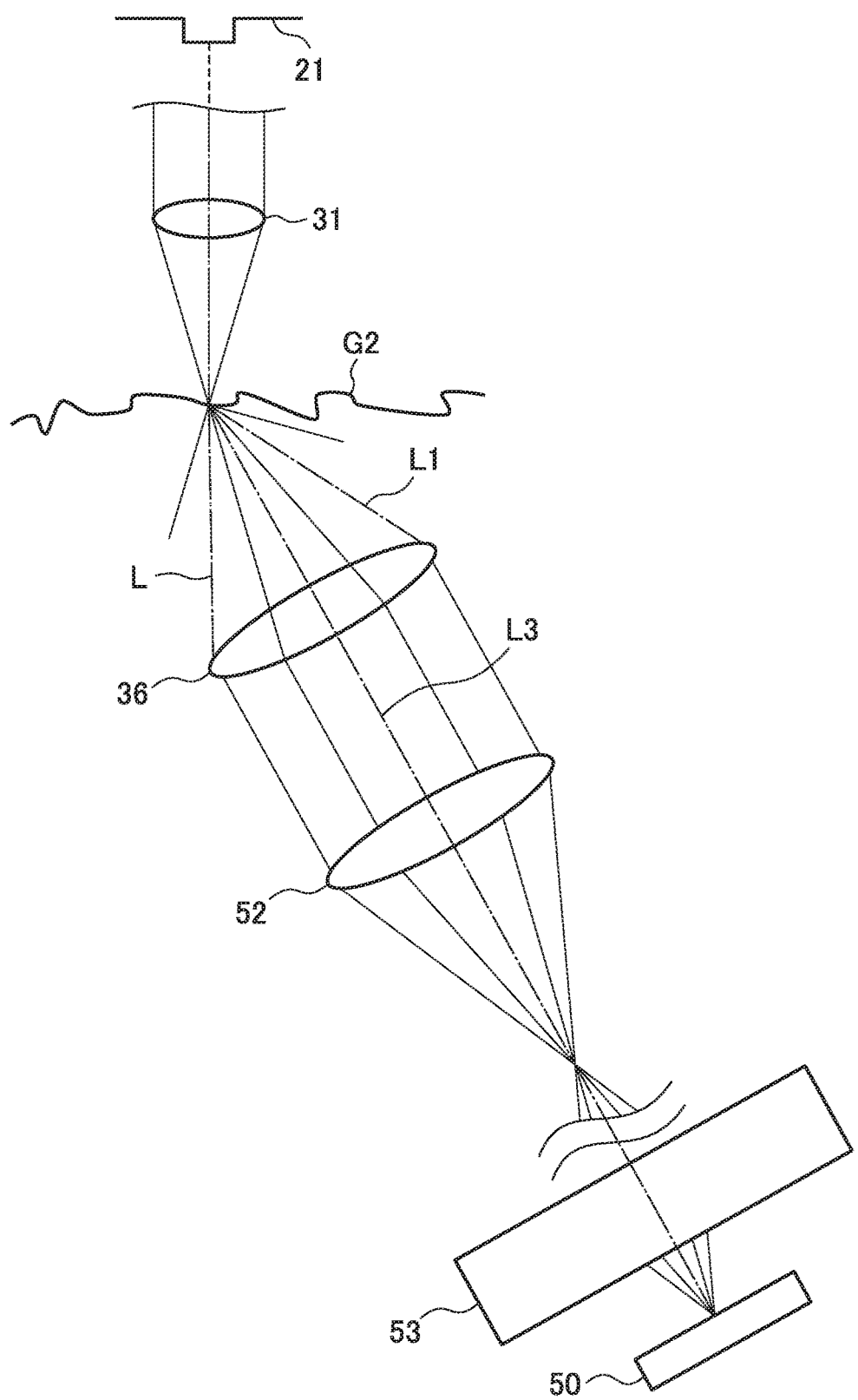
FIG. 8 is a schematic diagram illustrating an optical system of Embodiment 4 of the optical distance measuring apparatus according to the present invention.

FIG. 8 is a schematic diagram illustrating a configuration of the optical distance measuring apparatus of the present embodiment. In the present embodiment, in order to process a scanning beam transmitted through the object under measurement G2 while improving lateral resolution, a tilted optical system illustrated in this diagram is disposed below the apparatus of the transmitted optical system in Embodiment 2, for example. Note that in FIG. 8, the illustration of optical system including the pupil transmission lens systems 25, 30, the two-dimensional scanning device 26, the signal comparator 33, the data processing unit 34, and the like, is omitted, and further, a photo detector 50 is adopted, in place of the photo detector group 29.

Further, in the present embodiment, a lens 36 is disposed by being tilted with respect to an optical axis of a zero order diffracted light to be the optical axis L of the objective lens 31. Concretely, a part of the zero order diffracted light and a part of the first order diffracted light transmitted through the object under measurement G2 are taken into the lens 36 in a state of being tilted by an optical axis L3 having an intermediate tilt angle between the optical axis L of the zero order diffracted light and an optical axis L1 of the first order diffracted light. Because of this, not only a part of the zero order diffracted light but also a part of the first order diffracted light having a higher spatial frequency compared to the case of using the same lens are taken in, realizing interference between these zero order diffracted light and first order diffracted light in an imaging optical system. Note that, although not illustrated, an identical optical system is disposed at a symmetrical position with respect to the optical axis L in the present embodiment.

Further, in the present embodiment, the lens 36 is tilted to obtain a part of the zero order diffracted light and a part of the first order diffracted light, and the diffracted lights which are turned into a parallel luminous flux by the lens 36 are gathered in a lens 52. The diffracted lights are overlapped with each other by this lens 52 in the vicinity of a focal point and substantially interfere. However, it is not interference of the zero order diffracted light and the positive and negative first order diffracted lights, and thus it is different from imaging of the object under measurement G2 itself.

Moreover, the pitches of interference fringes can be widened by elongating the effective focal length of the lens 52. If the focal lengths of the lens 36 and the lens 52 are the same, the pitches are naturally the same, and become the spatial frequency of the object under measurement G2. On the other hand, interference made by the other optical system of the negative first order diffracted light results in interference fringes with shifted pitches. However, when the photo detectors are large with respect to the pitches of the interference fringes, positioning of the elements receiving the positive and negative first order diffracted lights becomes difficult.

Accordingly, when the interference fringes themselves are enlarged by a magnifying optical system 53 and are made substantially equal to the size of the photo detector 50, phases are naturally reversed between the positive and negative first order diffracted lights, and thus the darkness and brightness reverse in the form that the zero order diffracted light becomes a bias. In this manner, information can be obtained quite easily up to an area where the spatial frequency is high, which enables to improve the MTF. This makes it possible to measure an optical distance with high reliability with respect to even the object under measurement G2 which is required to increase the lateral resolution. In the case of the present embodiment, since the lens 52 is used, a wavefront aberration is tolerated to the extent that the phase difference between the zero order diffracted light and the first order diffracted light which are incident on this lens 52 is reflected as it is. Therefore, it is not necessary to use an expensive lens. Further, although not described in detail, it is also possible that the magnifying optical system 53 is omitted, and the photo detector 50 is disposed at a defocus position deviated from the focal point of the lens 52. At this time, it is possible to reduce a contrast of interference fringes because of a wavefront distortion of secondary wavefront, which enables to substantially bring about an effect of overlapping the zero order diffracted light and the other diffracted lights.

Here, a method of specifically adjusting photo detectors will be described briefly.

When information extracted from the object under measurement G2 is phase information, it is performed through two systems, one between the first order diffracted light and the zero order diffracted light and one between the negative first order diffracted light and the zero order diffracted light, and the photo detectors are adjusted so that when one photo detector has the maximum amount of light, the other photo detector has almost zero amount. When information extracted from the object under measurement G2 is intensity information, it is performed through two systems, one between the first order diffracted light and the zero order diffracted light and one between the negative first order diffracted light and the zero order diffracted light, and the photo detectors are adjusted so that when one photo detector has the maximum amount of light, the other photo detector also has the maximum amount.

Note that in the present embodiment, even lenses having focal lengths which are different in some degree can be used as they are because they are to the extent that the pitches of interference fringes change in some degree if there is no large change in amount of light to be received in the photo detectors for them and the wavefront aberration in the lens surface is not large. Further, the limit of the spatial frequency which can be obtained becomes about 1.5 times. This optical system is constituted by using only the lens system and thus is very simple and strong against disturbances.

Further, in the above-described embodiments, each of the photo detectors is positioned on any side divided by the boundary line, it is also possible that the photo detector is disposed while straddling the boundary line. Also in this case, it is only required that the photo detector is positioned in a form of being displaced to one side with respect to the boundary line.

In the foregoing, the respective embodiments according to the present invention have been described. However, the present invention is not limited to the above-described respective embodiments, and various modifications can be made to implement the invention within the range not departing from the spirit of the present invention.

The optical distance measuring apparatus of the present invention is not only capable of measuring the distance to a sample being an object under is measurement and a shape of the sample, but also applicable to measurement apparatuses of various types, such as microscopes. Further, the optical distance measuring apparatus of the present invention is applicable not only to microscopes but also to various types of optical apparatuses and measurement apparatuses using electromagnetic waves having wave motion, and is capable of improving the resolutions of these optical apparatuses and measurement apparatuses using electromagnetic waves having wave motion.

What is claimed is:

1. An optical distance measuring apparatus, comprising:
a light source irradiating a coherent irradiation light;
a scanning element scanning the irradiation light from the light source and sending it to an object under measurement;
two photo detectors existing with a boundary line in a direction perpendicular to an optical axis direction of the irradiation light interposed therebetween, each receiving the irradiation light modulated by being passed through the object under measurement in accordance with the scanning, and performing photoelectric conversion on the irradiation light; and
a measuring device obtaining phase information of the object under measurement based on signals each photoelectrically converted by each of the two photo detectors and a signal to be a reference for the scanning by the scanning element, and obtaining a measurement value regarding the object under measurement based on the phase information, wherein the measuring device, including a signal comparator and a data processor, extracts a direct-current component and an alternating-current component from the signal photoelectrically converted by each of the photo detectors, calculates, based on a differential signal of the obtained alternating-current component or a signal as a result of performing Hilbert transform on the obtained alternating-current component, a main frequency component of the modulated signal, and compares this frequency with a spatial frequency which the object under measurement has in order to determine the measurement value of the object under measurement.

2. The optical distance measuring apparatus according to claim 1, wherein
the scanning element is set to a two-dimensional scanning element scanning the irradiation light in two directions, respectively, which are orthogonal to each other, and the irradiation light irradiated to the object under measurement by the scanning in at least one direction out of the two directions is modulated.

3. The optical distance measuring apparatus according to claim 1, wherein
the measuring device turns an alternating-current component of the signal photoelectrically converted by each of the photo detectors into digitalized data, and adjusts, by changing an addition amount of the data, a range of obtaining the measurement value regarding the object under measurement.

4. The optical distance measuring apparatus according to claim 1, wherein
a beam splitter is disposed between the light source and the object under measurement, and the irradiation light reflected by the object under measurement and returned from the object under measurement is reflected by the beam splitter to allow each of the photo detectors to receive the irradiation light passed through the object under measurement.

5. The optical distance measuring apparatus according to claim 1, wherein
each of the photo detectors receives the irradiation light passed through the object under measurement by being transmitted through the object under measurement.

* * * * *